United States Patent
Lee et al.

(10) Patent No.: US 11,689,360 B2
(45) Date of Patent: Jun. 27, 2023

(54) QUANTUM KEY DISTRIBUTION METHOD, DEVICE, AND SYSTEM

(71) Applicant: KT CORPORATION, Gyeonggi-do (KR)

(72) Inventors: Ji-eun Lee, Daejeon (KR); Choon-gul Park, Daejeon (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/625,923

(22) PCT Filed: Sep. 15, 2020

(86) PCT No.: PCT/KR2020/012418
§ 371 (c)(1),
(2) Date: Jan. 10, 2022

(87) PCT Pub. No.: WO2021/054693
PCT Pub. Date: Mar. 25, 2021

(65) Prior Publication Data
US 2022/0255736 A1    Aug. 11, 2022

(30) Foreign Application Priority Data
Sep. 16, 2019 (KR) .......................... 10-2019-0113371

(51) Int. Cl.
*H04L 9/08*    (2006.01)
(52) U.S. Cl.
CPC .......... *H04L 9/0852* (2013.01); *H04L 9/0822* (2013.01)
(58) Field of Classification Search
CPC .............................. H04L 9/0852; H04L 9/0822
(Continued)

(56) References Cited

U.S. PATENT DOCUMENTS 9,774,401 B1\* 9/2017 Borrill ................. H04L 9/0852
2005/0286723 A1 12/2005 Vig et al.
(Continued)

FOREIGN PATENT DOCUMENTS

CN    107302429 A    10/2017
JP    2008-504791 A    2/2008
(Continued)

OTHER PUBLICATIONS

Hoi-Kwong Lo, Measurement-Device-Independent Quantum Key Distribution; PRL 108, 130503; Year:2012; pp. 1-5.*

*Primary Examiner* — Monjur Rahim
(74) *Attorney, Agent, or Firm* — IP Legal Services, LLC

(57) ABSTRACT

Provided are a quantum key distribution method, device, and system. The quantum key distribution system may include: a (1-1)th quantum key distribution device (QKD1-1); a (2-1)th quantum key distribution device (QKD2-1) connected to the QKD1-1 by a first quantum channel (CH1); a (3-1)th quantum key distribution device (QKD3-1) connected to a (1-2)th quantum key distribution device (QKD1-2) by a second quantum channel (CH2); a first quantum node control device (QNC1) for controlling the operation of the QKD1-1 and the QKD1-2; a second quantum node control device (QNC2) for controlling the operation of the QKD2-1; and a third quantum node control device (QNC3) for controlling the operation of the QKD3-1, wherein: in the QNC1, the first quantum key passes through a plurality of paths including a first path (P1) for connecting the QNC1 and the QNC3, so as to bypass the CH1, thereby being transmitted to the QNC2; and in the P1, the key is encoded with a third quantum key shared between the QKD1-2 and the QKD3-1, and is transmitted.

13 Claims, 9 Drawing Sheets

(58) Field of Classification Search
USPC .......................................................... 380/281
See application file for complete search history.

(56) References Cited

U.S. PATENT DOCUMENTS

| | | | | |
|---|---|---|---|---|
| 2009/0022322 A1* | 1/2009 | Trifonov | ............... | H04B 10/70 380/278 |
| 2010/0299526 A1 | 11/2010 | Wiseman et al. | | |
| 2012/0177201 A1* | 7/2012 | Ayling | ................ | H04L 9/0858 380/278 |
| 2013/0347112 A1 | 12/2013 | Martin Ayuso et al. | | |
| 2014/0341575 A1* | 11/2014 | Choi | .................. | H04B 10/294 398/51 |
| 2015/0236852 A1 | 8/2015 | Tanizawa | | |
| 2016/0013810 A1* | 1/2016 | Gross | .................. | H03M 13/09 714/776 |
| 2016/0197723 A1 | 7/2016 | Takahashi | | |
| 2016/0248581 A1 | 8/2016 | Fu et al. | | |
| 2019/0379463 A1* | 12/2019 | Shields | ................. | H04L 63/061 |
| 2020/0351086 A1* | 11/2020 | Walenta | ................. | H04L 9/083 |
| 2020/0351087 A1* | 11/2020 | Mccandlish | .......... | H04L 9/0819 |
| 2020/0409232 A1* | 12/2020 | Weiner | .................. | G06N 10/00 |
| 2021/0044433 A1* | 2/2021 | Hay | ........................ | H04L 9/0855 |
| 2021/0126778 A1* | 4/2021 | Parkin | .................... | H04B 10/85 |
| 2022/0173895 A1* | 6/2022 | Lord | ......................... | H04L 9/08 |
| 2022/0255736 A1* | 8/2022 | Lee | ........................ | H04L 9/0855 |

FOREIGN PATENT DOCUMENTS

| | | |
|---|---|---|
| JP | 6426477 B2 | 11/2018 |
| KR | 10-2012-0071883 A | 7/2012 |
| KR | 10-2016-0050912 A | 5/2016 |
| KR | 10-2017-0115055 A | 10/2017 |
| KR | 10-2017-0125659 A | 11/2017 |
| KR | 10-2018-0056205 A | 5/2018 |
| WO | 2012/089711 A1 | 7/2012 |

* cited by examiner

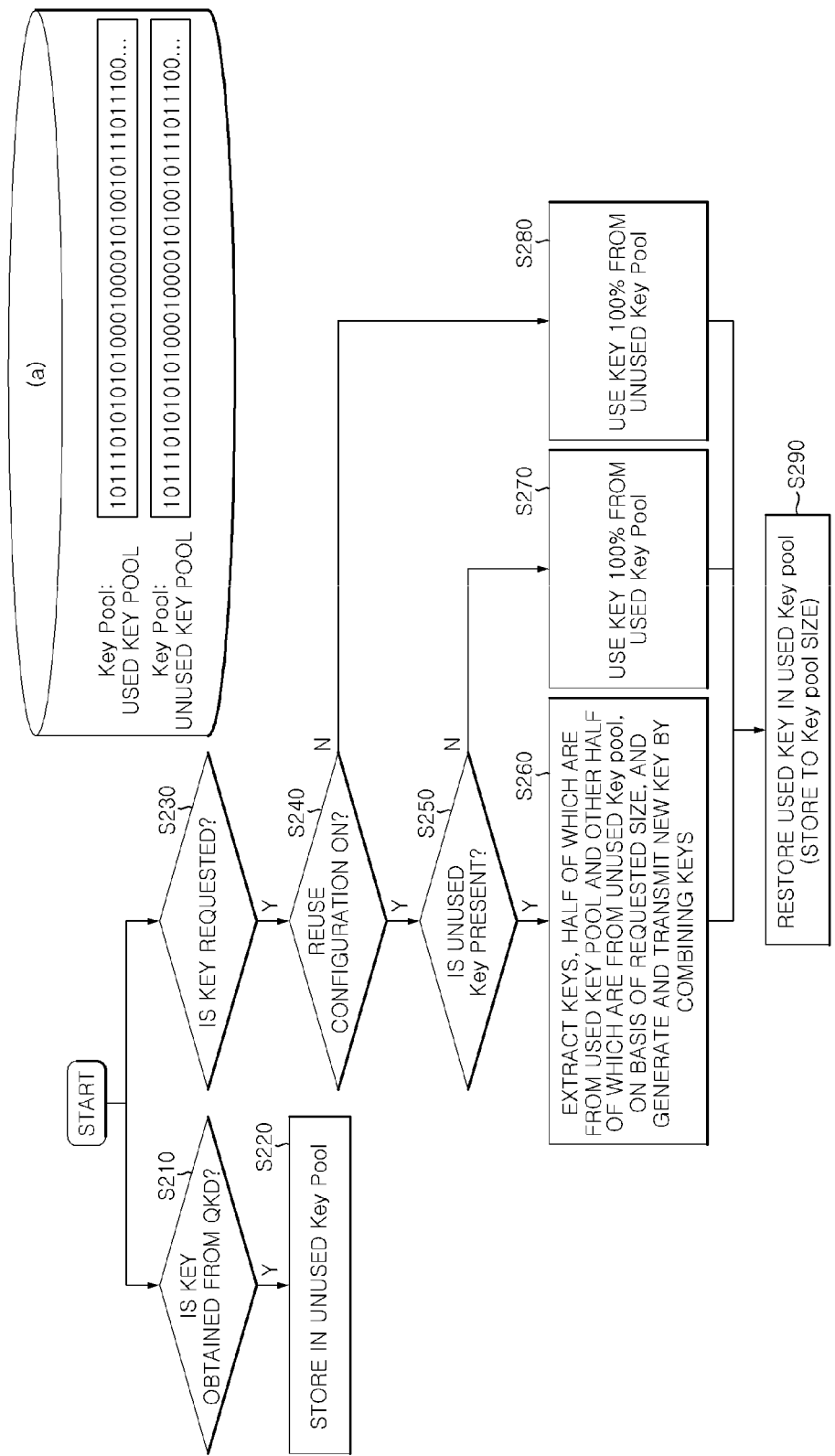

QUANTUM KEY DISTRIBUTION METHOD, DEVICE, AND SYSTEM

CROSS REFERENCE TO RELATED APPLICATIONS

This application is a National Stage Patent Application of PCT International Patent Application No. PCT/KR2020/012418 (filed on Sep. 15, 2020) under 35 U.S.C. § 371, which claims priority to Korean Patent Application No. 10-2019-0113371 (filed on Sep. 16, 2019), the teachings of which are incorporated herein in their entireties by reference.

TECHNICAL FIELD

The present disclosure relates to a quantum key distribution method, a quantum key distribution device, and a quantum key distribution system and, more particularly, to a quantum key distribution method, a quantum key distribution device, and a quantum key distribution system for properly providing a quantum cryptographic key even when failure occurs in a first quantum channel CH1 connecting a first quantum key distribution device QKD1 and a second quantum key distribution device QKD2 of a quantum key distribution system.

BACKGROUND ART

Recently, many studies and research have been actively conducted for detecting and treating various diseases including cancer in an early stage. Due to the explosive popularity of wired and wireless communication services, social awareness of personal privacy has increased in recent years, and the security of a communication network has been emerging as an important issue. Particularly, since the security of communication networks related to countries, companies, banking, and the like are important not only in a personal aspect but also in a social aspect, the importance of the security has been significantly emphasized.

However, typical communication security technology does not fully protect communication contents from external attacks. In order to fully protect the communication contents, quantum cryptography communication technology is introduced. The quantum cryptography communication technology theoretically guarantees very high security and has been spotlighted as a next-generation security technology.

Accordingly, there are many studies actively conducted on quantum key distribution (QKD) for distributing a quantum cryptographic key to a service device, such as a device and a terminal included in a quantum cryptography communication system.

In particular, in a quantum cryptography communication system, an application requests and obtains a quantum cryptographic key according to a required standard (e.g., the length of a quantum cryptographic key, the update period of a quantum cryptographic key, or the like) from a quantum key distribution (QKD) device. The QKD device generates a quantum cryptographic key and encrypts data using the obtained quantum cryptographic key to perform communication.

Thus, to properly provide a quantum cryptography communication service, it is necessary to provide the quantum cryptographic key according to the required standard requested by the application without interruption. For example, if a service needs to be provided with a 256-bit quantum cryptographic key every 10 seconds and if the service fails to be provided with the quantum cryptographic key at a proper time, the service may use the existing quantum cryptographic key continuously. In this case, the security may not be secured at a desired level.

In particular, a security-sensitive service may require a new quantum cryptographic key on a rapid cycle. Here, if the application fails to be provided with a quantum cryptographic key on a desired cycle, security quality may deteriorate, and the quality of the service may be not secured.

Accordingly, a quantum key distribution (QKD) device requires a method for properly providing a quantum cryptographic key without interruption even when a quantum cryptographic key cannot be properly generated due to a noise in a quantum channel, hacking of the quantum channel, or the like. However, an appropriate solution has not yet been proposed.

DISCLOSURE OF INVENTION

Technical Problem

The present disclosure has been made in view of the above-mentioned problems, and an aspect of the present disclosure is to provide a quantum key distribution method, a quantum key distribution device, and a quantum key distribution system for properly providing a quantum cryptographic key without interruption even when a failure occurs in a first quantum channel CH1 connecting a first quantum key distribution device QKD1 and a second quantum key distribution device QKD2 of a quantum key distribution system.

In accordance with an aspect of the present disclosure, a quantum key distribution method, a quantum key distribution device, and a quantum key distribution system may be provided for properly distributing a quantum cryptographic key via a plurality of paths even in a long-distance section where a quantum key distribution system cannot distribute a quantum cryptographic key via a single path.

Embodiments of the present disclosure will be clearly identified and understood by an expert or a researcher in this technical field through the detailed description below.

Solution to Problem

In accordance with an embodiment, a quantum key distribution system may include: a 1-1 quantum key distribution device QKD1-1; a 2-1 quantum key distribution device QKD2-1 configured to be connected with the 1-1 quantum key distribution device QKD1-1 through a first quantum channel CH1; a 3-1 quantum key distribution device QKD3-1 configured to be connected with a 1-2 quantum key distribution device QKD1-2 through a second quantum channel CH2; a first quantum node controller QNC1 configured to control an operation of the 1-1 quantum key distribution device QKD1-1 and an operation of the 1-2 quantum key distribution device QKD1-2; a second quantum node controller QNC2 configured to control an operation of the 2-1 quantum key distribution device QKD2-1; and a third quantum node controller QNC3 configured to control an operation of the 3-1 quantum key distribution device QKD3-1, wherein the first quantum node controller QNC1 transmits a first quantum cryptographic key to the second quantum node controller QNC2 via a plurality of paths including a first path P1 connecting the first quantum node controller QNC1 and the third quantum node controller QNC3 by bypassing the first quantum channel CH1, and the first quantum cryptographic key is encrypted with a third quantum cryptographic key, which is shared between the 1-2 quantum key distribution device QKD1-2 and the 3-1 quantum key distribution device QKD3-1, and is transmitted in the first path P1.

When it is detected that a failure occurs in the first quantum channel CH1, the quantum cryptographic key may be distributed via the plurality of paths including the first path P1 by bypassing the first quantum channel CH1.

The quantum cryptographic key may be distributed via the plurality of paths in a long-distance section where it is impossible to distribute the quantum cryptographic key via a single path.

The quantum cryptographic key to be distributed may be distributed to a plurality of nodes via the plurality of paths.

The first quantum node controller QNC1 may receive a second quantum cryptographic key generated by the 2-1 quantum key distribution device QKD2-1 from the 1-1 quantum key distribution device QKD1-1 and the third quantum cryptographic key generated by the 3-1 quantum key distribution device QKD3-1 from the 1-2 quantum key distribution device QKD1-2.

The first quantum node controller QNC1 may calculate a quantum cryptographic key generation rate using the quantum cryptographic key transmitted from the 1-1 quantum key distribution device QKD1-1.

The quantum key distribution system may further include a 3-2 quantum key distribution device QKD3-2 configured to be connected with a 2-2 quantum key distribution device QKD2-2, an operation of which is controlled by the second quantum node controller QNC2, via a third quantum channel CH3, wherein the third quantum node controller QNC3 may control an operation of the 3-2 quantum key distribution device QKD3-2, and the second quantum node controller QNC2 may receive the first quantum cryptographic key, which is transmitted from the first quantum node controller QNC1, through a second path P2 connecting the third quantum node controller QNC3 and the second quantum node controller QNC2 and may then decode the first quantum cryptographic key with a fourth quantum cryptographic key shared between the 3-2 quantum key distribution device QKD3-2 and the 2-2 quantum key distribution device QKD2-2.

The quantum key distribution system may further include a quantum network management server QMS configured to detect occurrence of a failure in the first quantum channel CH1 and to perform control to configure the plurality of paths including the first path P1 so that the first quantum node controller QNC1 transmits the first quantum cryptographic key to the second quantum node controller QNC2 by bypassing the first quantum channel CH1.

The quantum network management server QMS may detect whether the failure occurs in the first quantum channel CH1 in view of a quantum cryptographic key generation rate of a quantum cryptographic key received from the first quantum node controller QNC1.

In accordance with another embodiment, a quantum key distribution method may include: a quantum cryptographic key bypassing distribution determination operation in which a first quantum node controller QNC1 determines to distribute a quantum cryptographic key by bypassing a first quantum channel CH1 connecting a 1-1 quantum key distribution device QKD1-1 and a 2-1 quantum key distribution device QKD2-1; a quantum cryptographic key encryption operation of encrypting a first quantum cryptographic key with a third quantum cryptographic key shared between a 1-2 quantum key distribution device QKD1-2 and a 3-1 quantum key distribution device QKD3-1; and a quantum cryptographic key bypassing transmission operation of transmitting the encrypted first quantum cryptographic key to a second quantum node controller QNC2 through the plurality of paths including a first path P1 connecting the first quantum node controller QNC1 and a third quantum node controller QNC3 by bypassing the first quantum channel CH1.

In accordance with still another embodiment, a quantum key distribution system may include: a 1-1 quantum key distribution device QKD1-1; a 2-1 quantum key distribution device QKD2-1 configured to be connected with the 1-1 quantum key distribution device QKD1-1 via a first quantum channel CH1; a first quantum node controller QNC1 configured to receive a first quantum cryptographic key generated by the 1-1 quantum key distribution device QKD1-1; a second quantum node controller QNC2 to receive a second quantum cryptographic key generated by the 2-1 quantum key distribution device QKD2-1; and a quantum network management server QMS configured to detect occurrence of a failure in the first quantum channel CH1 and to control the first quantum node controller QNC1 and the second quantum node controller QNC2 corresponding to the first quantum channel CH1 to generate a reuse quantum cryptographic key using the first quantum cryptographic key and the second quantum cryptographic key according to a quantum cryptographic key reuse policy.

The first quantum node controller QNC1 and the second quantum node controller QNC2 generate and share the reuse quantum cryptographic key by combining parts of the first quantum cryptographic key and the second quantum cryptographic key according to the quantum cryptographic key reuse policy.

The first quantum node controller QNC1 and the second quantum node controller QNC2 generate and share the reuse quantum cryptographic key by combining a used quantum cryptographic key and an unused quantum cryptographic key stream according to the quantum cryptographic key reuse policy.

Advantageous Effects of Invention

Accordingly, even when a failure occurs in a first quantum channel CH1 connecting a first quantum key distribution device QKD1 and a second quantum key distribution device QKD2, a quantum key distribution method, a quantum key distribution device, and a quantum key distribution system according to the embodiment of the present disclosure may properly provide a quantum cryptographic key without interruption by sharing the quantum cryptographic key via a plurality of paths bypassing the first quantum channel CH1 or generating a reuse quantum cryptographic key from a previously generated quantum cryptographic key.

BRIEF DESCRIPTION OF DRAWINGS

The accompanying drawings, which are included as a part of the detailed description to help the understanding of the present disclosure, provide embodiments of the present disclosure and describe the technical spirit of the present disclosure in conjunction with the detailed description, in which:

FIG. 9 is a flowchart illustrating operation of a quantum node controller QNC according to the configuration of a reuse policy according to an embodiment of the present disclosure.

BEST MODE FOR CARRYING OUT THE INVENTION

The present disclosure may be variously modified and may include various embodiments. Hereinafter, specific embodiments will be described in detail with reference to the accompanying drawings.

The following embodiments are provided for a comprehensive understanding of methods, devices, and/or systems described herein. However, these embodiments are provided merely for illustration, and the present disclosure is not limited thereto.

When detailed descriptions about a known technology related to the present disclosure are determined to make the gist of the present disclosure unclear in describing embodiments of the present disclosure, the detailed descriptions will be omitted herein. Furthermore, terms used below are defined in view of functions in the present disclosure and may thus be changed depending on a user, the intent of an operator, or the custom. Accordingly, the terms should be defined on the basis of the following overall description of this specification. The terminology used in the detailed description is for describing embodiments of the present disclosure only and is not intended to limit the present disclosure. Unless clearly used otherwise, singular forms are intended to include plural forms. It will be understood that the expression "include" or "comprise," when used in this description, specify the presence of stated features, integers, steps, operations, elements, or some or combinations thereof, but do not preclude the presence or addition of one or more other features, integers, steps, operations, elements, or some or combinations thereof.

Although the terms "first", "second", and the like may be used to describe various components, these components should not be limited by these terms. These terms are used only to distinguish one component from another component.

Hereinafter, a quantum key distribution system will be briefly described first, and then a quantum key distribution method, a quantum key distribution device, and a quantum key distribution system according to an embodiment of the present disclosure will be described in detail.

Figure 1:
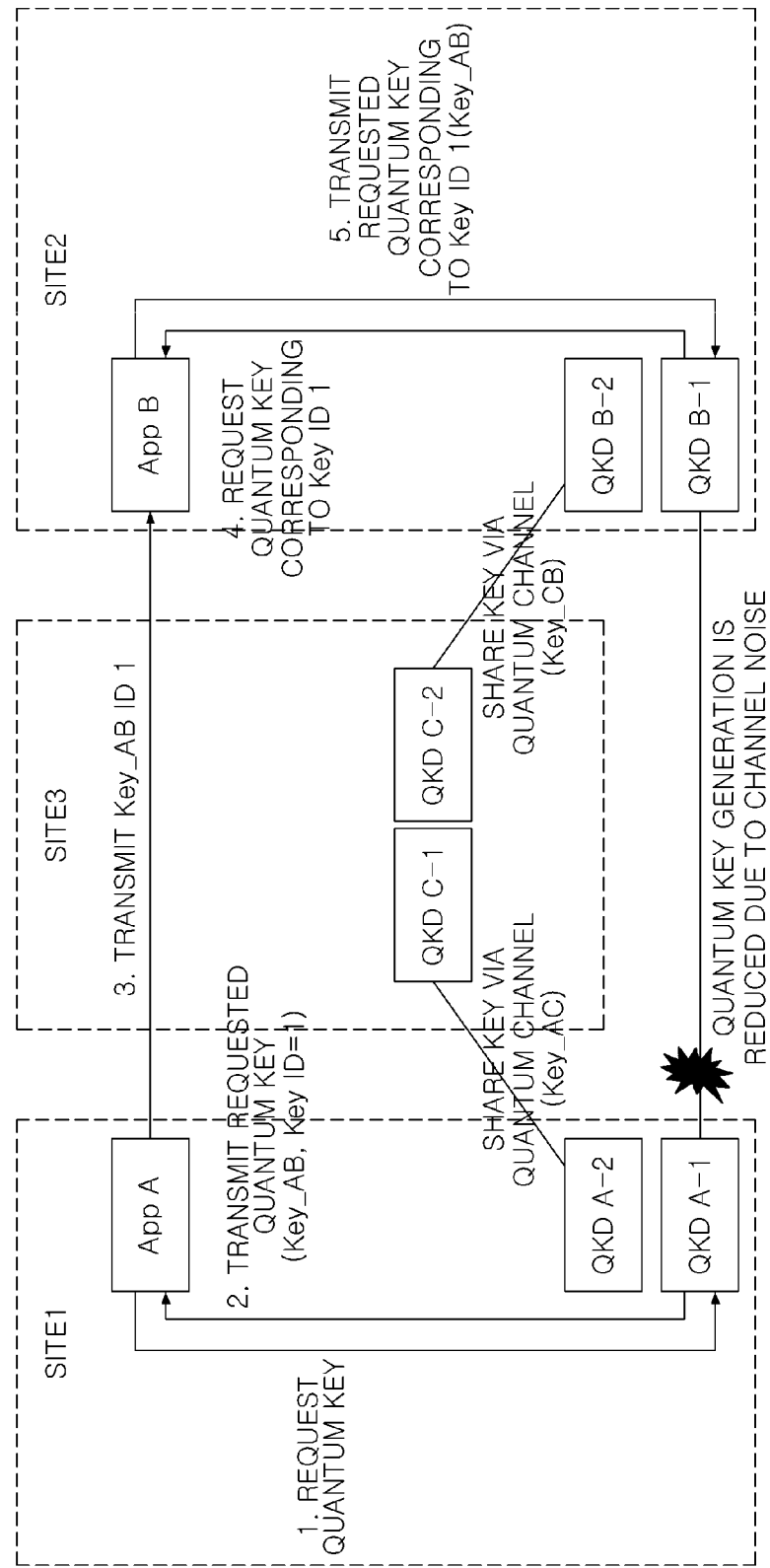
FIG. 1 illustrates a quantum key distribution system according to a related art.

FIG. 1 illustrates a quantum cryptographic key request and response process performed between a quantum key distribution QKD device and an application according to the European Telecommunications Standards Institute.

As illustrated in FIG. 1, a first application App A of a first site Site 1 requests a quantum cryptographic key from a 1-1 quantum key distribution device QKD A-1 when needing the quantum cryptographic key. Accordingly, the 1-1 quantum key distribution device QKD A-1 provides a quantum cryptographic key Key_AB having a specific identification code Key ID=1 to the first application App A.

The first application App A transmits the identification code Key ID=1 to a second application App B of a second site Site 2 to communicate with, and the second application App B is provided with the same quantum cryptographic key Key_AB from a 2-1 quantum key distribution device QKD B-1 using the identification code Key ID=1.

However, when generation of a quantum cryptographic key is reduced in a quantum channel between the 1-1 quantum key distribution device QKD A-1 and the 2-1 quantum key distribution device QKD B-1 due to a noise, hacking, or the like, generation of a quantum cryptographic key between the 1-1 quantum key distribution device QKD A-1 and the 2-1 quantum key distribution device QKD B-1 is reduced, and thus the first application App A and the second application App B provided with the quantum cryptographic key from the 1-1 quantum key distribution device QKD A-1 and the 2-1 quantum key distribution device QKD B-1 may not be sufficiently provided with the quantum cryptographic key necessary for a service.

In order to overcome such shortcoming, the quantum cryptographic key can be shared between the first application App A and the second application App B using a 3-1 quantum key distribution device QKD C-1 of a third site Site 3 connected to the 1-2 quantum key distribution device QKD A-2 of the first site Site 1, a 3-2 quantum key distribution device QKD C-2 of the third site Site 3 connected to a 2-2 quantum key distribution device QKD B-2 of the second site Site 2, or the like by bypassing the quantum channel where a failure occurs. However, as illustrated in FIG. 1, in a related art, a quantum cryptographic key Key_AC shared between the 1-2 quantum key distribution device QKD A-2 and the 3-1 quantum key distribution device QKD C-1 is different from a quantum cryptographic key Key_CB shared between the 2-2 quantum key distribution device QKD B-2 and the 3-2 quantum key distribution device QKD C-2. Accordingly, it is difficult to share the quantum cryptographic key between the first application App A and the second application App B, and the first application App A and the second application App B cannot properly perform quantum cryptography communication.

In the quantum key distribution method, the quantum key distribution device, and the quantum key distribution system according to the embodiment of the present disclosure, even when a failure occurs in the quantum channel connecting the 1-1 quantum key distribution device QKD A-1 of the first site Site 1 and the 2-1 quantum key distribution device QKD B-1 of the second site Site 2, it is possible to properly share a quantum cryptographic key between the first application App A and the second application App B safely and without interruption i) by using a multilink that bypasses the quantum channel ii) by regenerating a quantum cryptographic key using a defined reuse policy.

Hereinafter, the quantum key distribution method, the quantum key distribution device, and the quantum key distribution system according to the embodiment of the present disclosure will be described with reference to the accompanying drawings.

Figure 2:
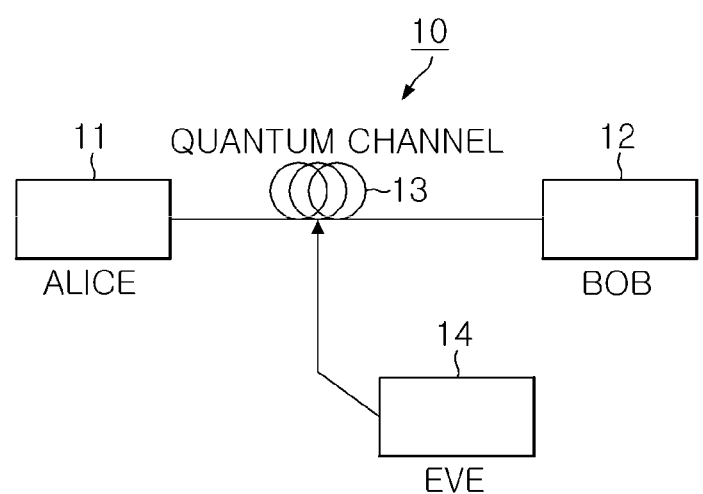
FIG. 2 illustrates a quantum key distribution system according to an embodiment of the present disclosure.

FIG. 2 illustrates a quantum key distribution system 10 according to an embodiment of the present disclosure. As illustrated in FIG. 2, the quantum key distribution system 10 according to the embodiment of the present disclosure may include a transmitter 11, a receiver 12, and a quantum channel 13. The transmitter 11 and the receiver 12 generate and share a quantum cryptographic key by exchanging optical signals through the quantum channel 13.

Here, the transmitter 11 and the receiver 12 may be servers, clients or terminal devices connected to a server, communication devices, such as gateways or routers, or portable devices having mobility or may be configured using various devices capable of communication by generating and sharing a quantum key.

The quantum channel 13 is provided between the transmitter 11 and the receiver 12 to transmit an optical signal. The quantum channel 13 may be configured using an optical fiber. However, the present disclosure is not limited thereto. For example, any medium capable of transmitting an optical signal may be used to configure the quantum channel 13.

Accordingly, the transmitter 11 and the receiver 12 may exchange information necessary to generate the quantum cryptographic key using the phase, polarization, and the like of the optical signal according to various protocols, such as the BB84 protocol. The transmitter 11 and the receiver 12 may generate and share the quantum cryptographic key in order to effectively prevent an attacker 14 from stealing the quantum cryptographic key and attempting to hack the quantum cryptographic key.

Furthermore, a quantum cryptography communication system may perform communication while performing encryption and decryption using the quantum cryptographic key generated in the quantum key distribution system 10. Therefore, the security of the communication system is enhanced according to the embodiment of the present disclosure.

Figure 3:
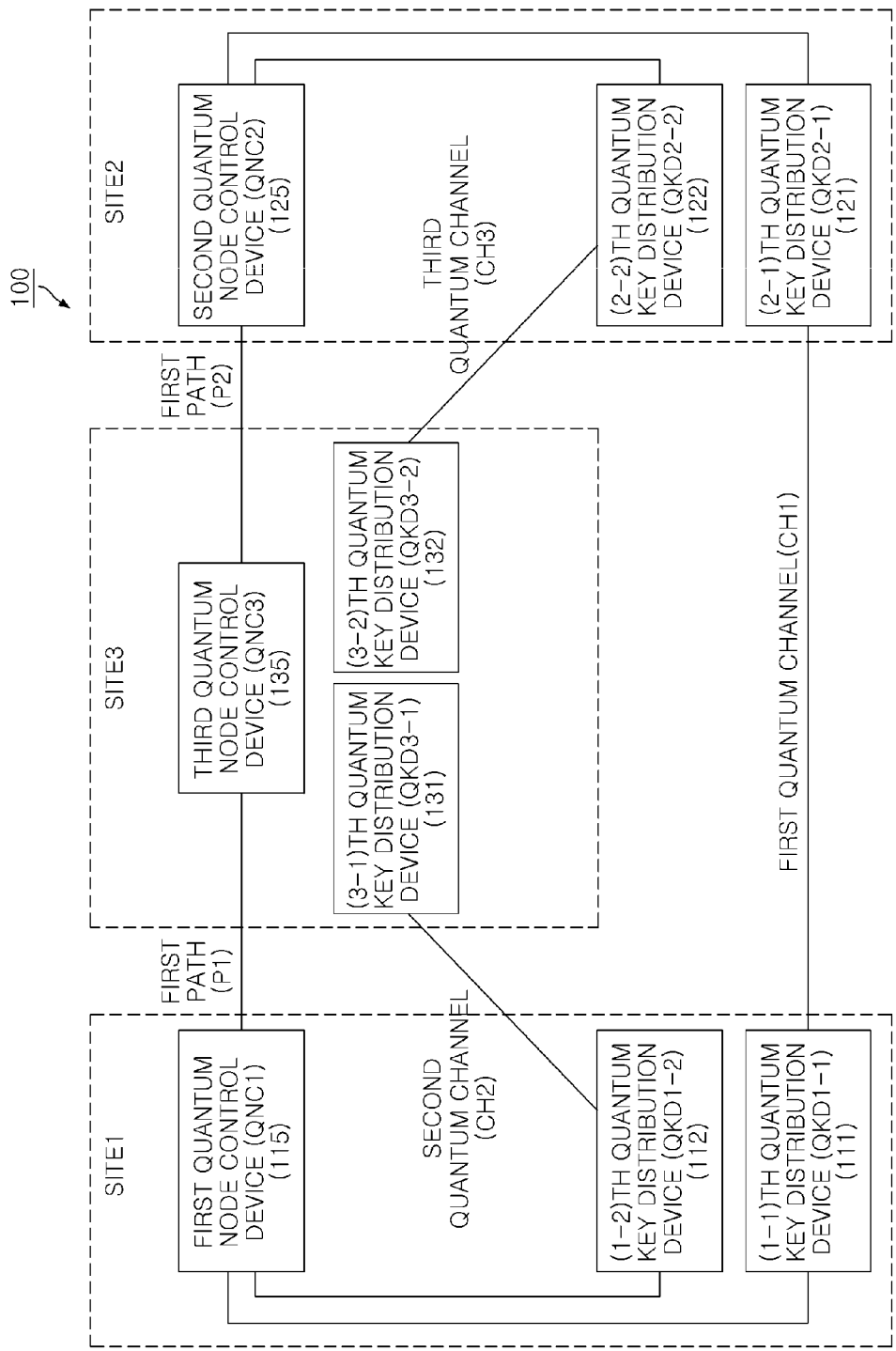
FIG. 3 is a block diagram illustrating a quantum key distribution system according to an embodiment of the present disclosure.

FIG. 3 is a block diagram illustrating a quantum key distribution system 100 according to an embodiment of the present disclosure. As illustrated in FIG. 3, the quantum key distribution system 100 according to the embodiment of the present disclosure may include a 1-1 quantum key distribution device QKD1-1, a 2-1 quantum key distribution device QKD2-1 121 connected with the 1-1 quantum key distribution device QKD1-1 111 through a first quantum channel CH1, a 3-1 quantum key distribution device QKD3-1 131 connected with a 1-2 quantum key distribution device QKD1-2 112 through a second quantum channel CH2, a first quantum node controller QNC1 115 to control the operation of the 1-1 quantum key distribution device QKD1-1 111 and the 1-2 quantum key distribution device QKD1-2 112, a second quantum node controller QNC2 125 to control the operation of the 2-1 quantum key distribution device QKD2-1 121, and a third quantum node controller QNC3 135 to control the operation of the 3-1 quantum key distribution device QKD3-1 131.

In the quantum key distribution system 100 according to the embodiment of the present disclosure, the first quantum node controller QNC1 115 transmits a first quantum cryptographic key to the second quantum node controller QNC2 125 via a plurality of paths including a first path P1 connecting the first quantum node controller QNC1 115 and the third quantum node controller QNC3 135 by bypassing the first quantum channel CH1. Here, in the first path P1, the first quantum cryptographic key is encrypted with a third quantum cryptographic key shared between the 1-2 quantum key distribution device QKD1-2 112 and the 3-1 quantum key distribution device QKD3-1 131 and is transmitted.

Here, when a failure occurs in the first quantum channel CH1, the quantum key distribution system 100 according to the embodiment of the present disclosure may distribute the quantum cryptographic key via the plurality of paths including the first path P1 by bypassing the first quantum channel CH1, in order to effectively distribute the quantum cryptographic key via the plurality of paths by bypassing the first quantum channel CH1 even when the failure occurs in the first quantum channel CH1.

In addition, even when a transmitter 11 and a receiver 12 to which a quantum cryptographic key is distributed are positioned at a long distance where the quantum cryptographic key cannot not be distributed via a single path, the quantum key distribution system 100 according to the embodiment of the present disclosure may properly distribute the quantum cryptographic key via a plurality of paths.

Furthermore, even when it is intended to distribute a quantum cryptographic key to a plurality of nodes as in multicasting, the quantum key distribution system 100 according to the embodiment of the present disclosure may easily distribute the quantum cryptographic key to be distributed to the plurality of nodes via a plurality of paths.

In FIG. 3, the first quantum node controller QNC1 115, the 1-1 quantum key distribution device QKD1-1 111, and the 1-2 quantum key distribution device QKD1-2 112 are disposed in the same first site Site 1. However, the present disclosure is not limited thereto. Further, the 1-1 quantum key distribution device QKD1-1 111 and the 1-2 quantum key distribution device QKD1-2 112 may be configured as a single device in FIG. 3. However, the present disclosure is not limited thereto. For example, the 1-1 quantum key distribution device QKD1-1 111 and the 1-2 quantum key distribution device QKD1-2 112 may be configured as separate devices in accordance with another embodiment.

As illustrated in FIG. 3, the quantum key distribution system 100 according to the embodiment of the present disclosure may further include a 3-2 quantum key distribution device QKD3-2 132 connected with a 2-2 quantum key distribution device QKD2-2 122, the operation of which is controlled by the second quantum node controller QNC2, via a third quantum channel CH3.

The third quantum node controller QNC3 controls the operation of the 3-2 quantum key distribution device QKD3-2. When a failure occurs in the first quantum channel CH1, the second quantum node controller QNC2 125 receives the first quantum cryptographic key, transmitted from the first quantum node controller QNC1 115, through a second path P2 connecting the third quantum node controller QNC3 135 and the second quantum node controller QNC2 125 and then decodes the first quantum cryptographic key with a fourth quantum cryptographic key shared between the 3-2 quantum key distribution device QKD3-2 132 and the 2-2 quantum key distribution device QKD2-2 122.

FIG. 3 shows the second quantum node controller QNC2 125, the 2-1 quantum key distribution device QKD2-1 121, and the 2-2 quantum key distribution device QKD2-2 122 may be disposed in the same second site Site 2. However, the present disclosure is not limited thereto. Further, the 2-1 quantum key distribution device QKD2-1 121 and the 2-2 quantum key distribution device QKD2-2 122 may be configured as a single device as shown in FIG. 3. However, the present disclosure is not limited thereto. For example, the 2-1 quantum key distribution device QKD2-1 121 and the 2-2 quantum key distribution device QKD2-2 122 may be configured as separate devices.

Similarly, FIG. 3 shows that the third quantum node controller QNC3 135, the 3-1 quantum key distribution device QKD3-1 131, and the 3-2 quantum key distribution device QKD3-2 132 may be disposed in the same second site Site 3. However, the present disclosure is not limited thereto.

Further, FIG. 3 shows the 3-1 quantum key distribution device QKD3-1 131 and the 3-2 quantum key distribution device QKD3-2 132 may be configured as a single device. However, the present disclosure is not limited thereto. For example, the 3-1 quantum key distribution device QKD3-1 131 and the 3-2 quantum key distribution device QKD3-2 132 may be configured as separate devices in accordance with another embodiment.

As illustrated in FIG. 3, the quantum key distribution system 100 according to the embodiment of the present disclosure may further include a quantum network management server QMS 160 that detects the occurrence of a failure in the first quantum channel CH1 and performs control to configure a plurality of paths including the first path P1 so that the first quantum node controller QNC1 115 transmits the first quantum cryptographic key to the second quantum node controller QNC2 125 by bypassing the first quantum channel CH1.

The quantum network management server QMS 160 may detect whether a failure occurs in the first quantum channel CH1 in view of the quantum cryptographic key generation rate of the quantum cryptographic key received from the first quantum node controller QNC1 115 and may configure the plurality of paths including the first path P1 to transmit the first quantum key from the first quantum node controller QNC1 115 to the second quantum node controller QNC2 125 by bypassing the first quantum channel CH1.

Although FIG. 3 shows that the first quantum node controller QNC1 115 is connected to the third quantum node controller QNC3 135 via the first path P1 and is then connected to the second quantum node controller QNC2 125 via the second path P2, the present disclosure is not limited thereto. Alternatively, the first quantum key may be transmitted from the first quantum node controller QNC1 115 to the second quantum node controller QNC2 125 through a multilink passing through a plurality of paths connecting to an additional quantum node controller QNC.

Figure 4:
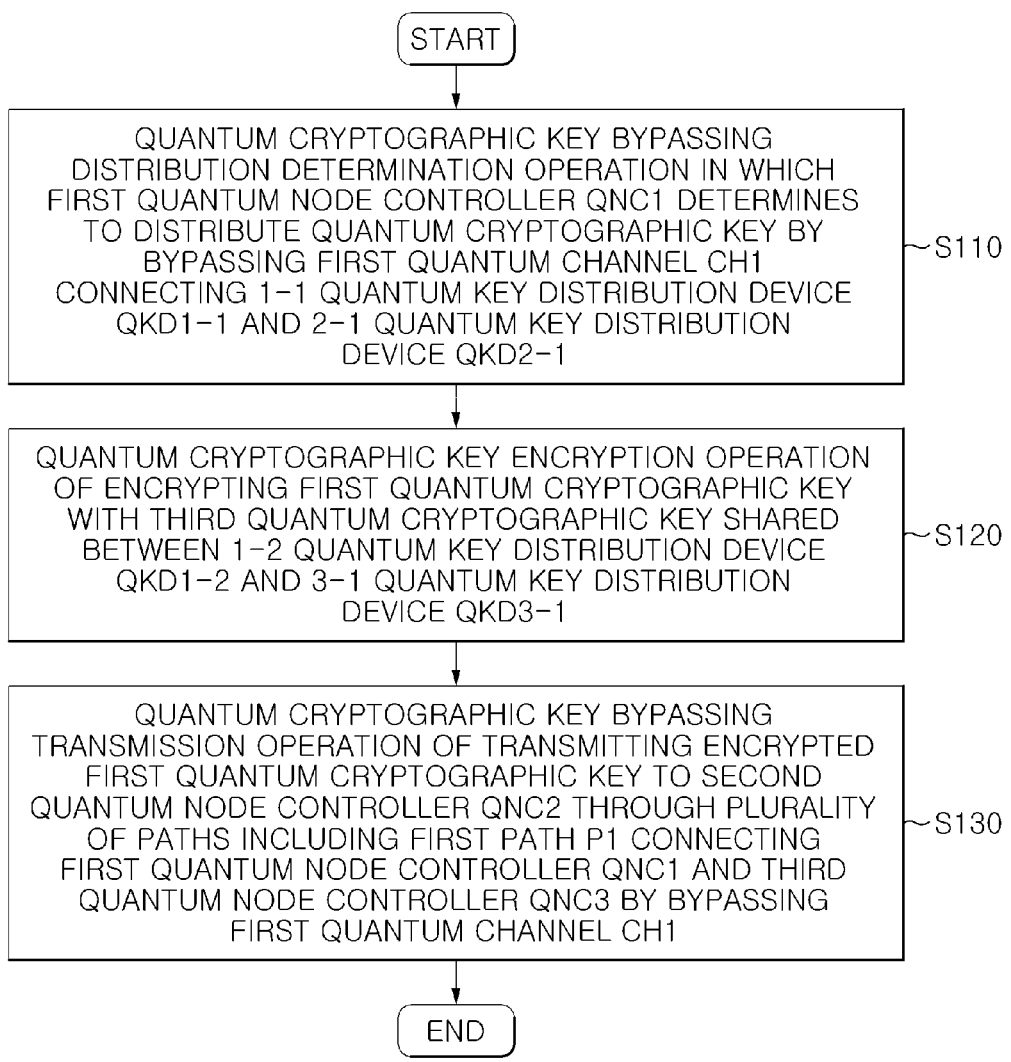
FIG. 4 is a flowchart illustrating a quantum key distribution method according to an embodiment of the present disclosure.

FIG. 4 is a flowchart illustrating a quantum key distribution method according to an embodiment of the present disclosure. As illustrated in FIG. 4, the quantum key distribution method according to the embodiment of the present disclosure may include i) a quantum cryptographic key bypassing distribution determination operation (S110) in which the first quantum node controller QNC1 115 determines to distribute a quantum cryptographic key by bypassing the first quantum channel CH1 connecting the 1-1 quantum key distribution device QKD1-1 111 and the 2-1 quantum key distribution device QKD2-1 121, ii) a quantum cryptographic key encryption operation (S120) of encrypting the first quantum cryptographic key with the third quantum cryptographic key shared between the 1-2 quantum key distribution device QKD1-2 112 and the 3-1 quantum key distribution device QKD3-1 131, and iii) a quantum cryptographic key bypassing transmission operation (S130) of transmitting the encrypted first quantum cryptographic key to the second quantum node controller QNC2 125 through the plurality of paths including the first path P1 connecting the first quantum node controller QNC1 115 and the third quantum node controller QNC3 135 by bypassing the first quantum channel CH1.

Accordingly, even when a failure occurs in the first quantum channel CH1 connecting the 1-1 quantum key distribution device QKD1-1 111 and the 2-1 quantum key distribution device QKD2-1 121 or a transmitter and a receiver are positioned at a long distance where a quantum cryptographic key cannot not be distributed via a single path, the quantum key distribution system 100 and the quantum key distribution method according to the embodiment of the present disclosure may share a quantum cryptographic key through a plurality of paths bypassing the first quantum channel CH1. Therefore, the quantum cryptographic key may be properly provided without interruption in accordance with the embodiments.

Figure 5:
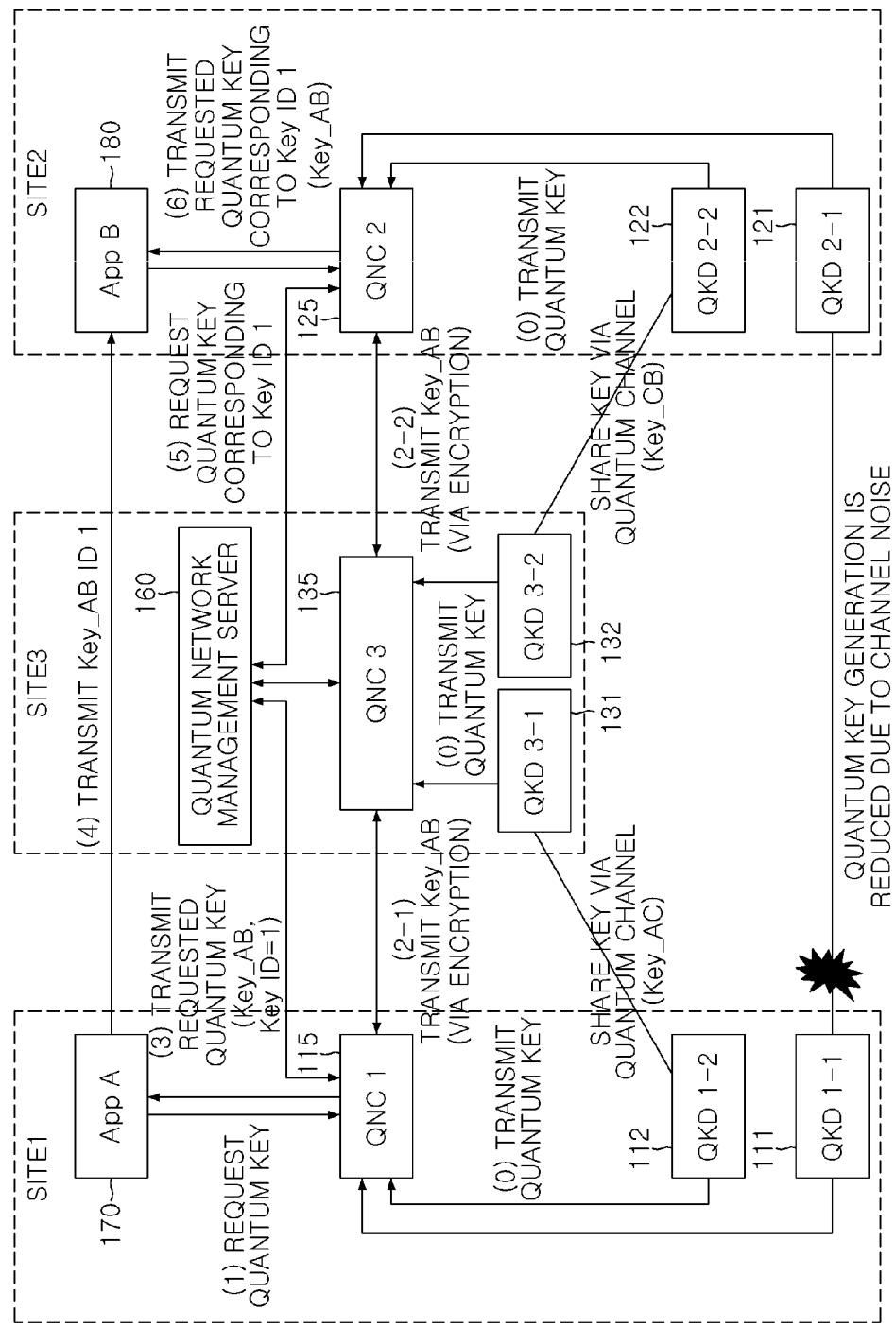
FIG. 5 illustrates an operation of a quantum key distribution system according to an embodiment of the present disclosure.

FIG. 5 illustrates operation of a quantum key distribution system 100 according to an embodiment of the present disclosure.

Hereinafter, regarding the quantum key distribution method, the quantum key distribution device, and the quantum key distribution system according to the embodiment of the present disclosure, the operation of each individual component is described in detail with reference to FIG. 3 to FIG. 5.

First, as illustrated in FIG. 5, in the quantum key distribution system 100 according to the embodiment of the present disclosure, each quantum key distribution device QKD generates and shares a quantum cryptographic key by exchanging optical signals through each quantum channel and transmits the generated quantum cryptographic key to a corresponding quantum node controller QNC ((0) of FIG. 5).

The quantum node controller QNC may function to receive, store, and manage the quantum cryptographic key generated by the quantum key distribution device QKD and to control and manage the state of the quantum key distribution device QKD.

The quantum node controller QNC may be configured as an independent device separate from the quantum key distribution device QKD or may be integrated with the quantum key distribution device QKD as a single device. Further, the quantum node controller QNC may be configured in various forms, such as a processor driven in a server or a communication device, in addition to a physical device.

Specifically, as illustrated in FIG. 5, the 1-1 quantum key distribution device QKD1-1 111 generates a quantum cryptographic key by exchanging optical signals with the 2-1 quantum key distribution device QKD2-1 121 through the first quantum channel CH1 and transmits the generated quantum cryptographic key to the first quantum node controller QNC1 115 ((0) of FIG. 5).

Although it has been shown above that the 1-1 quantum key distribution device QKD1-1 111 transmits the quantum cryptographic key to the first quantum node controller QNC1, the present disclosure is not limited thereto. Instead, it is possible to transmit a quantum key stream other than the quantum cryptographic key.

The 1-1 quantum key distribution device QKD1-1 111 may calculate a quantum cryptographic key generation rate from the quantum cryptographic key generated in the first quantum channel CH1.

The quantum network management server 160 may monitor the quantum cryptographic key generation rate in the first quantum channel CH1 calculated by the 1-1 quantum key distribution device QKD1-1 111 and may determine that a failure occurs in the first quantum channel CH1 due to a noise, hacking, or the like when the quantum cryptographic key generation rate in the first quantum channel CH1 is reduced to a predetermined threshold value or less.

Although it has been shown above that the quantum network management server 160 determines whether a failure occurs in the first quantum channel CH1 on the basis of the generation rate of the quantum cryptographic key generated by the 1-1 quantum key distribution device QKD1-1 111, the present disclosure is not necessarily limited thereto.

Instead, the 1-1 quantum key distribution device QKD1-1 111 may directly determine whether a failure occurs in the first quantum channel CH1.

Subsequently, when the occurrence of the failure in the first quantum channel CH1 is detected, the quantum network management server 160 calculates an alternative path bypassing the first quantum channel CH1.

A path search algorithm, such as Dijkstra's algorithm or constraint-based shortest path search algorithm, may be used when calculating the alternative path. Accordingly, an optimal alternative path excluding the first quantum channel CH1 in which the failure has occurred may be calculated.

The quantum network management server 160 may transmit information about the path replacing the first quantum channel CH1 to the quantum node controllers QNC to share the quantum cryptographic key using the alternate path.

Subsequently, the first quantum node controller QNC1 115 receives, from an application A App A driven in a first service device 170 corresponding to the 1-1 quantum key distribution device QKD1-1 111, a quantum cryptographic key request for performing communication with an application B App B driven in a second service device 180 corresponding to the 2-1 quantum key distribution device QKD2-1 121 connected through the first quantum channel CH1 ((1) of FIG. 5).

The first quantum node controller QNC1 115 prepares a first quantum cryptographic key (Key_AB in FIG. 5) to be used for quantum cryptography communication between the application A App A and the application B App B.

The first quantum cryptographic key may be a randomly generated cryptographic key or may be obtained by various methods, for example, selecting one of quantum cryptographic keys generated by the 1-1 quantum key distribution device QKD1-1 111 or the 1-2 quantum key distribution device QKD1-2 112.

The first quantum node controller QNC1 115 transmits the first quantum cryptographic key to the third quantum node controller QNC3 135 through the first path P1, which is a first section of the alternative path.

Here, the first quantum node controller QNC1 115 encrypts the first quantum cryptographic key with a third quantum cryptographic key generated between the 1-2 quantum key distribution device QKD1-2 112 and the 3-1 quantum key distribution device QKD3-1 131 and transmits the encrypted first quantum cryptographic key. The third quantum node controller QNC3 135 receives the encrypted first quantum cryptographic key and decrypts the encrypted first quantum cryptographic key with the third quantum cryptographic key ((2-1) of FIG. 5).

The alternative path may include a large number of unit paths. In each unit path, the first quantum cryptographic key may be encrypted with a quantum cryptographic key corresponding to each unit path, be transmitted, and then be decrypted. Therefore, the first quantum cryptographic key may be safely transmitted according to the embodiment of the present disclosure.

Accordingly, the first quantum cryptographic key is transmitted to the second quantum node controller QNC2 125 through a second path P2, which is the last section of the alternative path. The second quantum node controller QNC2 125 receives the first quantum cryptographic key encrypted with a fourth quantum cryptographic key and decrypts the encrypted first quantum cryptographic key with the fourth quantum cryptographic key ((2-2) in FIG. 5).

Subsequently, the first quantum node controller QNC1 115 transmits the first quantum cryptographic key (Key_AB of FIG. 5) to the application A App A of the first service device 170 and also transmits identification information (Key ID=1 of FIG. 5) about the first quantum cryptographic key is also transmitted ((3) in FIG. 5).

The application A is provided with the first quantum cryptographic key and transmits the identification information about the first quantum cryptographic key to the application B App B driven in the second user device 180 ((4) of FIG. 5).

The application B App B requests a quantum cryptographic key corresponding to the identification information (Key ID=1) from the second quantum node controller QNC2 125 ((5) of FIG. 5). Accordingly, the second quantum node controller QNC2 125 provides the first quantum cryptographic key (Key_AB of FIG. 5) to the application B App B ((6) in FIG. 5).

As described above, even when generation of a quantum cryptographic key is reduced due to the occurrence of a failure in the first quantum channel CH1, the quantum key distribution system 100 and the quantum key distribution method according to the embodiment of the present disclosure may properly provide the quantum cryptographic key required for the quantum cryptography communication between the application A App A driven in the first service device 170 and the application B App B driven in the second service device 180 without interruption by bypassing the first quantum channel CH1.

MODE FOR CARRYING OUT THE INVENTION

Figure 6:
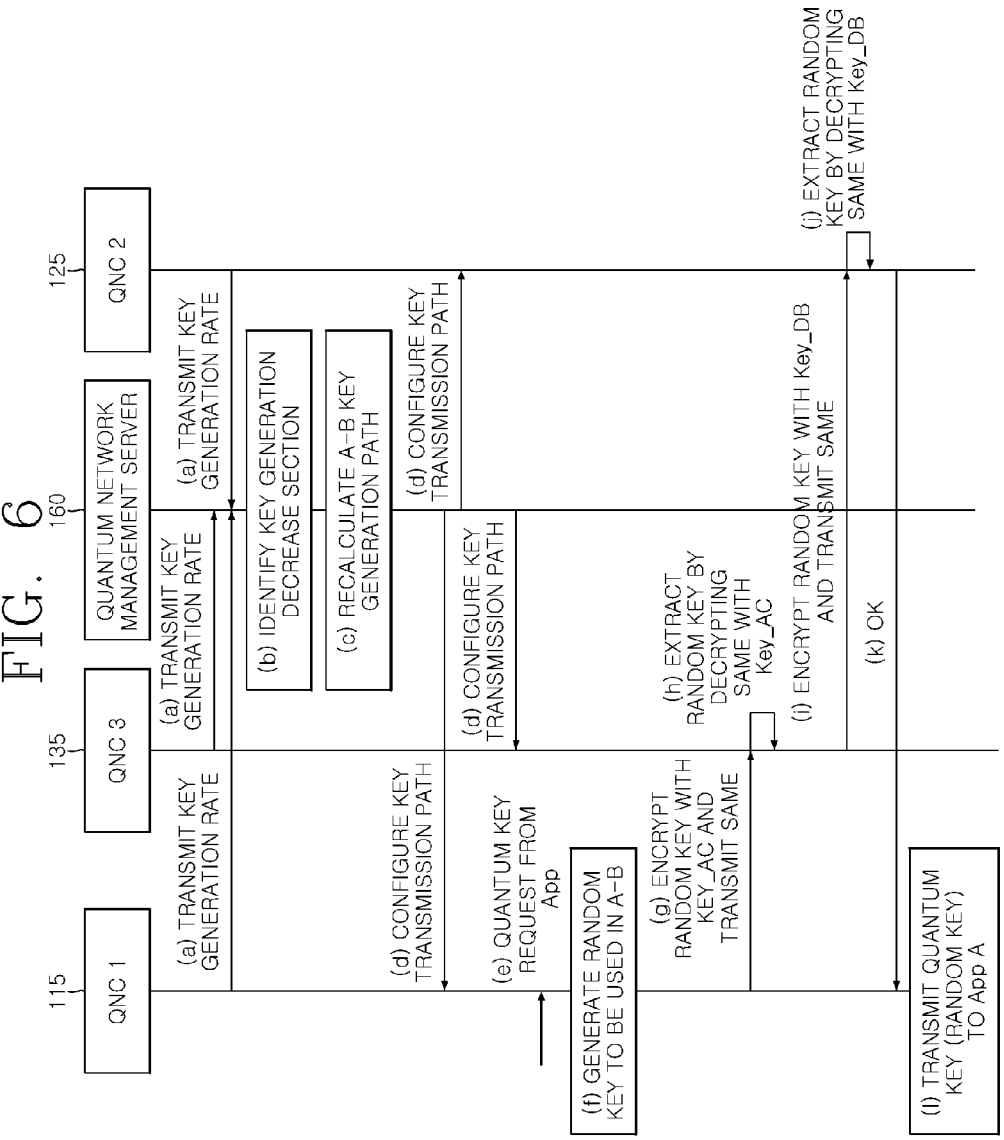
FIG. 6 is a flowchart illustrating operation of a quantum key distribution system according to an embodiment of the present disclosure.

FIG. 6 is a flowchart illustrating operation of the quantum key distribution system 100 according to an embodiment of the present disclosure.

As illustrated in FIG. 6, each quantum node controller QNC calculates a quantum cryptographic key generation rate from a generated quantum cryptographic key and transmits the quantum cryptographic key generation rate to the quantum network management server 160 ((a) of FIG. 6).

The quantum network management server 160 may identify a failure section in which quantum cryptographic key generation is reduced using the quantum cryptographic key generation rate ((b) of FIG. 6) and recalculates an alternative path for quantum cryptographic key generation for the failure section (A-B of FIG. 6) in which quantum cryptographic key generation is reduced ((c) of FIG. 6).

The quantum network management server 160 transmits the calculated alternative path for quantum cryptographic key generation to each quantum node controller to configure the same ((d) of FIG. 6).

Subsequently, when the first quantum node controller QNC1 115 receives a quantum cryptographic key request from an application ((e) of FIG. 6), the first quantum node controller QNC1 115 randomly generates a first quantum cryptographic key ((g) of FIG. 6) and transmits the first quantum cryptographic key to the third quantum node controller QNC3 135 through a first path QNC1-QNC3 of the alternative path, in which case the first quantum cryptographic key is encrypted with a third quantum cryptographic key (Key_AC of FIG. 6) corresponding to the first path and is transmitted ((g) of FIG. 6).

The third quantum node controller QNC3 135 receives the encrypted first quantum cryptographic key and decrypts the encrypted first quantum cryptographic key with the third quantum cryptographic key (Key_AC of FIG. 6), thereby extracting the first quantum cryptographic key ((h) of FIG. 6).

The third quantum node controller QNC3 135 encrypts the first quantum cryptographic key with a fourth quantum cryptographic key (Key_BD of FIG. 6) corresponding to a second path QNC3-QNC2 and transmits the encrypted first quantum cryptographic key to the second quantum node controller QNC2 125 ((i) of FIG. 6).

The second quantum node controller QNC2 125 receives the encrypted first quantum cryptographic key and decrypts the encrypted first quantum cryptographic key with the fourth quantum cryptographic key (Key_BD of FIG. 6), thereby extracting the first quantum cryptographic key ((j) of FIG. 6).

Subsequently, the second quantum node controller QNC2 125 notifies the first quantum node controller QNC1 115 that the first quantum cryptographic key is shared ((k) of FIG. 6).

The first quantum node controller QNC1 115 and the second quantum node controller QNC2 125 provide the first quantum cryptographic key to an application A App A and an application B App B, respectively ((1) of FIG. 6), and the application A App A and the application B App B may be properly provided with the quantum cryptographic key necessary for quantum cryptography communication without interruption despite the occurrence of the failure in the first quantum channel CH1, thereby performing the quantum cryptography communication.

A quantum key distribution system 100 according to another embodiment of the present disclosure may be configured to include i) a 1-1 quantum key distribution device QKD1-1 111, ii) a 2-1 quantum key distribution device QKD2-1 121 connected with the 1-1 quantum key distribution device QKD1-1 111 via a first quantum channel CH1, iii) a first quantum node controller QNC1 115 to receive a first quantum cryptographic key generated by the 1-1 quantum key distribution device QKD1-1 111, iv) a second quantum node controller QNC2 125 to receive a second quantum cryptographic key generated by the 2-1 quantum key distribution device QKD2-1 121, and v) a quantum network management server QMS 160 to detect occurrence of a failure in the first quantum channel CH1 and to control the first quantum node controller QNC1 115 and the second quantum node controller QNC2 125 corresponding to the first quantum channel CH1 to generate a reuse quantum cryptographic key using the first quantum cryptographic key and the second quantum cryptographic key according to a quantum cryptographic key reuse policy.

Here, the first quantum node controller QNC1 115 and the second quantum node controller QNC2 125 may generate and share the reuse quantum cryptographic key by combining parts of the first quantum cryptographic key and the second quantum cryptographic key according to the quantum cryptographic key reuse policy.

Accordingly, even when quantum cryptographic key generation is reduced due to the occurrence of a failure in the first quantum channel CH1, the quantum key distribution system 100 according to the other embodiment of the present disclosure may generate a reuse quantum cryptographic key from an existing quantum cryptographic key by applying the quantum cryptographic key reused policy, thereby properly providing a quantum cryptographic key required for quantum cryptography communication without interruption.

Hereinafter, the operation of the quantum key distribution system 100 according to another embodiment of the present disclosure will be described in detail with reference to FIG. 3 and FIG. 7.

Figure 7:
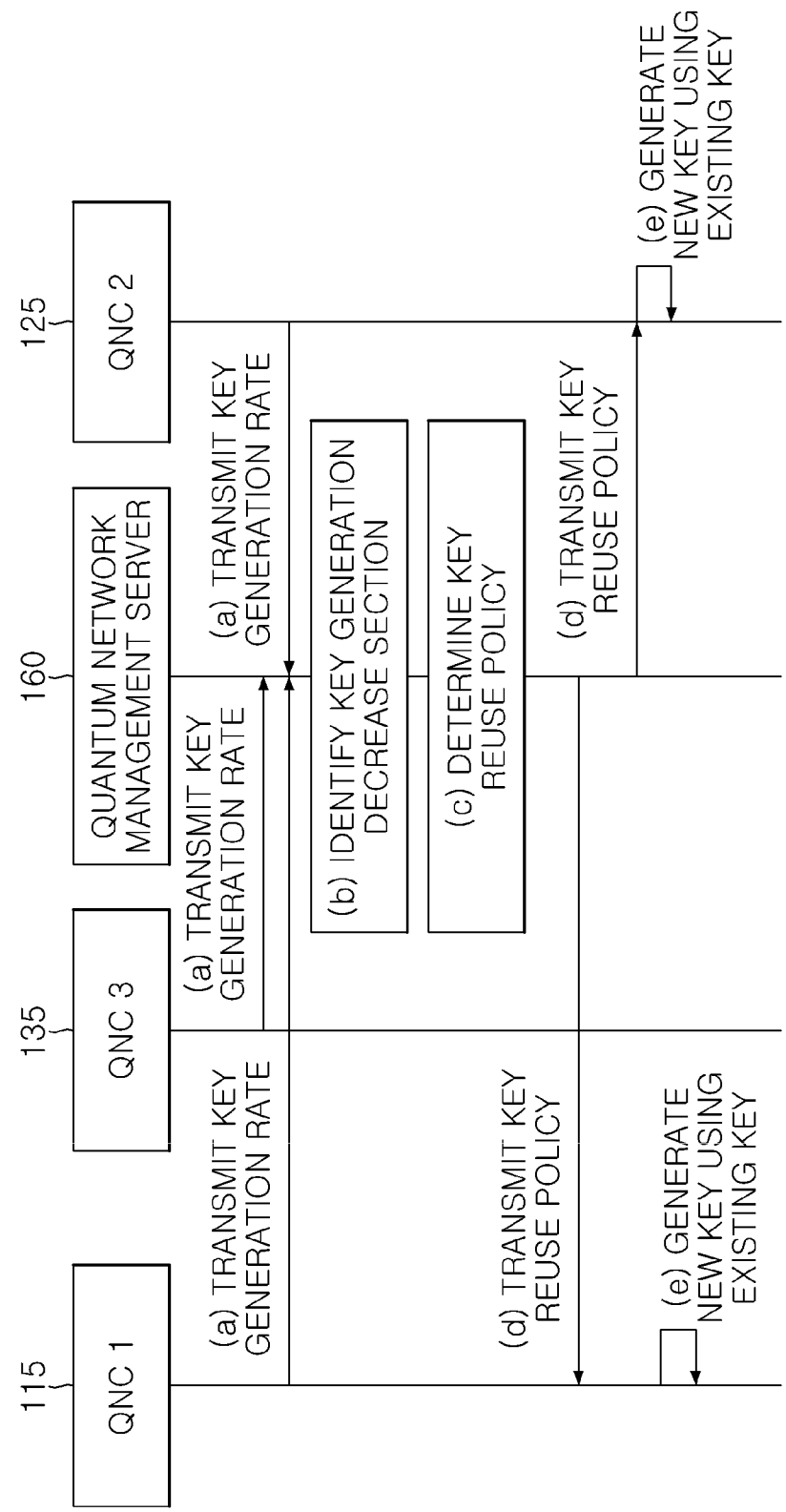
FIG. 7 is a flowchart illustrating operation of a quantum key distribution system according to another embodiment of the present disclosure.

As illustrated in FIG. 7, each quantum node controller QNC calculates a quantum cryptographic key generation rate from a generated quantum cryptographic key and transmits the quantum cryptographic key generation rate to the quantum network management server 160 ((a) of FIG. 7).

The quantum network management server 160 may identify a failure section in which quantum cryptographic key generation is reduced using the quantum cryptographic key generation rate ((b) of FIG. 7) and determines whether to apply the quantum cryptographic key reuse policy to the failure section in which quantum cryptographic key generation is reduced and the content of the quantum cryptographic key reuse policy ((c) of FIG. 7). When there is an adequate path for relaying the quantum cryptographic key, a relay method and the reuse policy may be selectively used. However, when there is no adequate path for relaying the quantum cryptographic key in a specific section, only a reuse method may be used, in which case the quantum network management server 160 performs the reuse policy.

Subsequently, the quantum network management server 160 transmits the determined quantum cryptographic key reuse policy to the first quantum node controller QNC1 115 and the second quantum node controller QNC2 125 corresponding to the quantum channel in which the failure has occurred ((d) of FIG. 7).

The first quantum node controller QNC1 115 and the second quantum node controller QNC2 125 may generate a reuse quantum cryptographic key using an existing quantum cryptographic key according to the quantum cryptographic key reuse policy received from the quantum network management server 160 ((e) of FIG. 7).

According to the quantum cryptographic key reuse policy, it is possible to determine whether to use specific quantum cryptographic key identification information (Key ID) or which part of the quantum cryptographic key is used when generating the reuse quantum cryptographic key.

In an example, a new quantum cryptographic key may be generated by adopting one bit of each of Key IDs 1, 2, 3, and 4. Specifically, when Key ID=1 is 1011, Key ID=2 is 0101, Key ID=3 is 1100, and Key ID=4 is 1111, a reuse quantum cryptographic key of 1101 may be generated by adopting one bit of each of Key IDs 1, 2, 3, and 4, specifically by combining a first bit (1) of Key ID 1, a second bit (1) of Key ID 2, a third bit (0) of Key ID 3, and a fourth bit (1) of Key ID 4.

Figure 8:
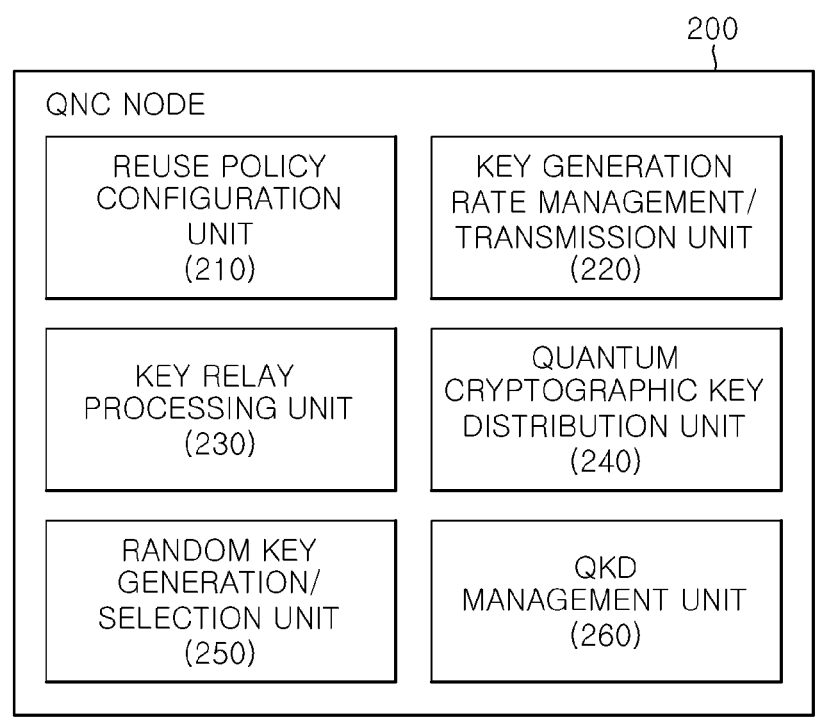
FIG. 8 illustrates a quantum node controller QNC according to an embodiment of the present disclosure.

FIG. 8 illustrates a quantum node controller QNC 200 according to an embodiment of the present disclosure.

As illustrated in FIG. 8, the quantum node controller QNC 200 according to the embodiment of the present disclosure may include a processor or a set of processors. Further, the quantum node controller QNC 200 may include a plurality of circuitry units each performing a dedicated function. Each circuitry unit may be referred to as a unit. For example, the quantum node controller QNC 200 may include at least one component of a quantum cryptographic key reuse policy configuration unit 210, a quantum cryptographic key generation rate management/transmission unit 220, a quantum cryptographic key relay processing unit 230, a quantum cryptographic key distribution unit 240, a random quantum cryptographic key generation/selection unit 250, and a quantum key distribution device management unit 260.

The quantum cryptographic key reuse policy configuration unit 210 configures a quantum cryptographic key reuse policy transmitted from the quantum network management server 160 to generate a reuse quantum cryptographic key. Further, in an embodiment of the present disclosure, as described in detail in FIG. 9, the quantum cryptographic key reuse policy configuration unit 210 may manage a used key pool and an unused key pool and may generate a reuse quantum cryptographic key using the used key pool and the unused key pool according to the reuse policy.

The quantum cryptographic key generation rate management/transmission unit 220 receives a quantum cryptographic key generated by a quantum key distribution device QKD, calculates and manages a quantum cryptographic key generation rate, and transmits the quantum cryptographic key generation rate to the quantum network management server 160.

The quantum cryptographic key relay processing unit 230 transmits a first quantum cryptographic key transmitted from a neighboring quantum node controller QNC 200 to another quantum node controller QNC 200.

The quantum cryptographic key distribution unit 240 performs a function of distributing the quantum cryptographic key generated by the quantum key distribution device QKD to a service device or the like.

The random quantum cryptographic key generation/selection unit 250 generates a random quantum cryptographic key or selects one of the quantum cryptographic keys generated by the quantum key distribution device QKD, thereby selecting the first quantum cryptographic key.

Finally, the quantum key distribution device management unit 260 functions to control and manage the quantum key distribution device QKD.

Accordingly, even when a failure occurs in a first quantum channel CH1 connecting a first quantum key distribution device QKD1 and a second quantum key distribution device QKD2, the quantum key distribution method, the quantum key distribution device, and the quantum key distribution system according to the embodiment of the present disclosure may properly provide a quantum cryptographic key without interruption by sharing the quantum cryptographic key via a plurality of paths bypassing the first quantum channel CH1 or generating a reuse quantum cryptographic key from a previously generated quantum cryptographic key.

Furthermore, the quantum key distribution method, the quantum key distribution device, and the quantum key distribution system according to the embodiment of the present disclosure relates to an end-to-end (E2E) quantum cryptographic key transmission technology and may extend a quantum key distribution (QKD) network for exchanging a quantum cryptographic key only within a short distance to be applied to exchange of a quantum cryptographic key even in a long distance and may also apply the network when a plurality of nodes needs to share the same quantum cryptographic key as in multicasting. Here, when the shared key is transmitted to the nodes to share the quantum cryptographic key, the quantum cryptographic key may be encrypted using a quantum key generated for each section and may then be transmitted, thereby being safely shared.

FIG. 9 is a flowchart illustrating operation of a quantum node controller QNC 200 according to a reuse policy in accordance with an embodiment of the present disclosure.

Hereinafter, the operation of the quantum node controller QNC 200 according to the reuse policy in accordance with the embodiment of the present disclosure will be described in detail with reference to FIG. 9.

First, referring to (a) of FIG. 9, until receiving a reuse policy from the quantum network management server 160, when the quantum node controller QNC 200 obtains a quantum cryptographic key from a quantum key distribution device QKD (S210), the quantum node controller QNC 200 stores the quantum cryptographic key in an unused key pool (S220), and when the quantum node controller QNC 200 uses the quantum cryptographic key upon receiving a quantum cryptographic key request (S230), the quantum node controller QNC 200 stores the quantum cryptographic key in a used key pool (S290).

Since it is impossible to store an unlimited number of quantum cryptographic keys in the used key pool, the quantum cryptographic keys are continuously stored until reaching the number of key bits, which is previously set to be used when quantum cryptographic keys become short. When the number of keys in the used key pool is greater than the set number of key bits, the used key pool is updated with the most recently obtained key stream by discarding the oldest quantum cryptographic key and storing the recently used quantum cryptographic key.

When the quantum network management server 160 recognizes a lack of quantum cryptographic keys and configures (e.g., defines) the reuse policy to the quantum node controller QNC 200, the quantum node controller QNC 200 may then be provided with keys to be used, half of which are from the used key pool and the other half of which are from the unused key pool upon receiving a key request (S260). Even in this case, a used quantum cryptographic key is stored again in the used key pool (S290), and only when there is no key in the unused key pool, a key to be provided to the client may be provided 100% from the used key pool (S270). Using this method makes it possible to prevent disconnection of a service by reusing quantum cryptographic keys even in a section where there are insufficient quantum cryptographic keys and to provide a quantum cryptographic key that ensures security since a reuse quantum cryptographic key generates a new key by combining a used key and an unused key even in a situation where the reuse quantum cryptographic key is used. The foregoing description is only an example, and the present disclosure is not necessarily limited thereto. Furthermore, the present disclosure may also provide a method in which the quantum network management server 160 processes the reuse policy by more various methods.

The foregoing description is provided merely to explain the technical idea of the present disclosure, and it will be apparent to those having ordinary skill in the art to which this disclosure belongs that various modifications and variations can be made in the present disclosure without departing from the essential characteristics of the present disclosure. The embodiments disclosed herein are provided not to limit but to describe the technical idea of the present disclosure and do not limit the scope of the present disclosure. The scope of the present disclosure should be construed as being defined by the appended claims, and any technical ideas within the appended claims and their equivalents should be construed as being included in the scope of the present disclosure.

The invention claimed is:

1. A quantum key distribution system comprising:
    a 1-1 quantum key distribution device (QKD1-1);
    a 2-1 quantum key distribution device (QKD2-1) configured to be connected with the 1-1 quantum key distribution device (QKD1-1) through a first quantum channel (CH1);
    a 3-1 quantum key distribution device (QKD3-1) configured to be connected with a 1-2 quantum key distribution device (QKD1-2) through a second quantum channel (CH2);
    a first quantum node controller (QNC1) configured to control operation of the 1-1 quantum key distribution device (QKD1-1) and operation of the 1-2 quantum key distribution device (QKD1-2);

a second quantum node controller (QNC2) configured to control operation of the 2-1 quantum key distribution device (QKD2-1); and a third quantum node controller (QNC3) configured to control operation of the 3-1 quantum key distribution device (QKD3-1), wherein the first quantum node controller (QNC1) transmits a first quantum cryptographic key to the second quantum node controller (QNC2) via a plurality of paths including a first path (P1) connecting the first quantum node controller (QNC1) and the third quantum node controller (QNC3) by bypassing the first quantum channel (CH1), and the first quantum cryptographic key is encrypted with a third quantum cryptographic key, which is shared between the 1-2 quantum key distribution device (QKD1-2) and the 3-1 quantum key distribution device (QKD3-1), and the first quantum cryptographic key is transmitted in the first path P1.

2. The quantum key distribution system of claim 1, wherein, when a failure occurs in the first quantum channel (CH1), the quantum cryptographic key is distributed via the plurality of paths comprising the first path (P1) by bypassing the first quantum channel (CH1).

3. The quantum key distribution system of claim 1, wherein the quantum cryptographic key is distributed via the plurality of paths in a long-distance section where it is impossible to distribute the quantum cryptographic key via a single path.

4. The quantum key distribution system of claim 1, wherein the quantum cryptographic key is distributed to a plurality of nodes via the plurality of paths.

5. The quantum key distribution system of claim 1, wherein the first quantum node controller (QNC1) receives a second quantum cryptographic key generated by the 2-1 quantum key distribution device (QKD2-1) from the 1-1 quantum key distribution device (QKD1-1) and the third quantum cryptographic key generated by the 3-1 quantum key distribution device (QKD3-1) from the 1-2 quantum key distribution device (QKD1-2).

6. The quantum key distribution system of claim 5, wherein the first quantum node controller (QNC1) calculates a quantum cryptographic key generation rate using the quantum cryptographic key transmitted from the 1-1 quantum key distribution device (QKD1-1).

7. The quantum key distribution system of claim 1, further comprising:
a 3-2 quantum key distribution device (QKD3-2) configured to be connected with a 2-2 quantum key distribution device (QKD2-2), an operation of which is controlled by the second quantum node controller (QNC2), via a third quantum channel (CH3),
wherein the third quantum node controller (QNC3) controls the 3-2 quantum key distribution device (QKD3-2), and
the second quantum node controller (QNC2) receives the first quantum cryptographic key, which is transmitted from the first quantum node controller (QNC1), through a second path (P2) connecting the third quantum node controller (QNC3) and the second quantum node controller (QNC2) and then decodes the first quantum cryptographic key with a fourth quantum cryptographic key shared between the 3-2 quantum key distribution device (QKD3-2) and the 2-2 quantum key distribution device (QKD2-2).

8. The quantum key distribution system of claim 1, further comprising:

a quantum network management server (QMS) configured to detect a failure in the first quantum channel (CH1) and to perform control to configure the plurality of paths comprising the first path (P1) so that the first quantum node controller (QNC1) transmits the first quantum key to the second quantum node controller (QNC2) by bypassing the first quantum channel (CH1).

9. The quantum key distribution system of claim 8, wherein the quantum network management server (QMS) detects whether the failure occurs in the first quantum channel (CH1) in view of a quantum cryptographic key generation rate of a quantum cryptographic key received from the first quantum node controller (QNC1).

10. A quantum key distribution method comprising:
a quantum cryptographic key bypassing distribution determination operation of, by a first quantum node controller (QNC1), determining to distribute a quantum cryptographic key by bypassing a first quantum channel (CH1) connecting a 1-1 quantum key distribution device (QKD1-1) and a 2-1 quantum key distribution device (QKD2-1);
a quantum cryptographic key encryption operation of encrypting a first quantum cryptographic key with a third quantum cryptographic key shared between a 1-2 quantum key distribution device (QKD1-2) and a 3-1 quantum key distribution device (QKD3-1); and
a quantum cryptographic key bypassing transmission operation of transmitting the encrypted first quantum cryptographic key to a second quantum node controller (QNC2) through the plurality of paths comprising a first path (P1) connecting the first quantum node controller (QNC1) and a third quantum node controller (QNC3) by bypassing the first quantum channel (CH1).

11. A quantum key distribution system comprising:
a 1-1 quantum key distribution device (QKD1-1);
a 2-1 quantum key distribution device (QKD2-1) configured to be connected with the 1-1 quantum key distribution device (QKD1-1) via a first quantum channel (CH1);
a first quantum node controller (QNC1) configured to receive a first quantum cryptographic key generated by the 1-1 quantum key distribution device (QKD1-1);
a second quantum node controller (QNC2) to receive a second quantum cryptographic key generated by the 2-1 quantum key distribution device (QKD2-1); and
a quantum network management server (QMS) configured to detect a failure in the first quantum channel (CH1) and to control the first quantum node controller (QNC1) and the second quantum node controller (QNC2) corresponding to the first quantum channel (CH1) to generate a reuse quantum cryptographic key using the first quantum cryptographic key and the second quantum cryptographic key according to a quantum cryptographic key reuse policy.

12. The quantum key distribution system of claim 11, wherein the first quantum node controller (QNC1) and the second quantum node controller (QNC2) generate and share the reuse quantum cryptographic key by combining parts of the first quantum cryptographic key and the second quantum cryptographic key according to the quantum cryptographic key reuse policy.

13. The quantum key distribution system of claim 11, wherein the first quantum node controller (QNC1) and the second quantum node controller (QNC2) generate and share the reuse quantum cryptographic key by combining a used quantum cryptographic key and an unused quantum cryptographic key stream according to the quantum cryptographic key reuse policy.

* * * * *